(12) United States Patent
Hashiguchi

(10) Patent No.: US 10,630,004 B2
(45) Date of Patent: *Apr. 21, 2020

(54) CONNECTION ASSISTING MEMBER AND CIRCUIT BOARD ASSEMBLY

(71) Applicant: Japan Aviation Electronics Industry, Limited, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/034,937

(22) Filed: Jul. 13, 2018

(65) Prior Publication Data

US 2019/0027842 A1    Jan. 24, 2019

(30) Foreign Application Priority Data

Jul. 24, 2017  (JP) ................... 2017-142448
Mar. 20, 2018  (JP) ................... 2018-052563

(51) Int. Cl.
| | |
|---|---|
| *H01R 4/24* | (2018.01) |
| *H02G 1/14* | (2006.01) |
| *H01R 13/24* | (2006.01) |
| *H01R 12/79* | (2011.01) |
| *H01R 12/58* | (2011.01) |
| *H01R 12/78* | (2011.01) |

(52) U.S. Cl.
CPC ............. *H01R 4/24* (2013.01); *H01R 12/79* (2013.01); *H01R 13/2457* (2013.01); *H02G 1/14* (2013.01); *H01R 12/585* (2013.01); *H01R 12/78* (2013.01)

(58) Field of Classification Search
CPC ........................................ H01R 4/24
See application file for complete search history.

(56) References Cited

U.S. PATENT DOCUMENTS 4,859,188 A * 8/1989 Neumann ............... H05K 3/326
439/45
7,785,113 B2 * 8/2010 Mizoguchi ............. H01R 12/58
439/67

(Continued)

FOREIGN PATENT DOCUMENTS

| DE | 102008002041 A1 | 12/2009 |
| JP | 2005-122901 A | 12/2005 |
| WO | WO2005/032224 A1 | 4/2005 |

*Primary Examiner* — Xuong M Chung Trans
(74) *Attorney, Agent, or Firm* — Muncy, Geissler, Olds & Lowe, PC

(57) ABSTRACT

A connection assisting member, for connecting a first circuit board having one or more through-holes each of which has a first contact portion formed on an inner surface thereof and a second circuit board having one or more bendable second contact portions, includes a base plate, and one or more projections projecting on a surface of the base plate and having elasticity, when fitted in a corresponding through-hole of the first circuit board as catching a corresponding second contact portion of the second circuit board, each of the one or more projections elastically presses the corresponding second contact portion of the second circuit board against the inner surface of the corresponding through-hole to electrically connect the first contact portion and the corresponding second contact portion to each other.

19 Claims, 11 Drawing Sheets

(56) References Cited

U.S. PATENT DOCUMENTS

| | | | | |
|---|---|---|---|---|
| 8,052,464 | B2* | 11/2011 | Maruishi | H01R 12/61 |
| | | | | 439/496 |
| 8,753,143 | B2* | 6/2014 | Su | H01R 12/594 |
| | | | | 439/492 |
| 9,287,645 | B2* | 3/2016 | Hashiguchi | H01R 13/62905 |
| 10,483,668 | B2* | 11/2019 | Hashiguchi | H01R 12/712 |
| 2009/0233465 | A1 | 9/2009 | Mizoguchi | |
| 2011/0278048 | A1 | 11/2011 | Numakura | |
| 2012/0149246 | A1 | 6/2012 | Iida et al. | |
| 2014/0104775 | A1 | 4/2014 | Clayton et al. | |

* cited by examiner

CONNECTION ASSISTING MEMBER AND CIRCUIT BOARD ASSEMBLY

BACKGROUND OF THE INVENTION

The present invention relates to a connection assisting member, particularly to a connection assisting member for connecting a first circuit board having one or more through-holes each of which has a first contact portion formed on an inner surface thereof and a second circuit board having one or more bendable second contact portions.

The present invention also relates to a circuit board assembly in which the first circuit board and the second circuit board are connected by means of the connection assisting member.

A connector for connecting a flexible flat cable to a circuit board such as a flexible printed circuit (FPC) is disclosed by, for example, JP 2005-122901 A. As shown in FIG. 27, this connector is for connecting a plurality of circuit conductors 2 arranged at an FPC 1 and a plurality of flat conductors 4 in a flat cable 3 and is composed of a connector body 5 and a plate member 6 that face each other so as to sandwich an overlap part where the FPC 1 and the flat cable 3 overlap. As shown in FIG. 28, the connector body 5 has a plurality of metallic penetrating pieces 7, while the plate member 6 has a plurality of receiving grooves 8 formed therein.

With the connector body 5 and the plate member 6 being positioned with respect to the FPC 1 and the flat cable 3 such that the penetrating pieces 7 and the receiving grooves 8 separately correspond to the circuit conductors 2 of the FPC 1 and the flat conductors 4 of the flat cable 3, the penetrating pieces 7 of the connector body 5 are thrust into the overlap part where the FPC 1 and the flat cable 3 overlap, and accordingly, the circuit conductors 2 of the FPC 1 and the flat conductors 4 in the flat cable 3 are sheared by the penetrating pieces 7. Upon insertion of the penetrating pieces 7, sheared parts of the circuit conductors 2 and sheared parts of the flat conductors 4 come into contact with the metallic penetrating pieces 7. As a result, the circuit conductors 2 of the FPC 1 and the flat conductors 4 of the flat cable 3 are electrically connected via the penetrating pieces 7.

Meanwhile, the circuit conductors 2 are disposed on a base, made of an insulating material, of the FPC 1, and the flat conductors 4 are covered with an insulating material of the flat cable 3. Therefore, when the penetrating pieces 7 are thrust into the overlap part where the FPC 1 and the flat cable 3 overlap, the base of the FPC 1 is also sheared along with the circuit conductors 2, and the insulating material of the flat cable 3 is also sheared along with the flat conductors 4. Consequently, a sheared piece of the insulating material may be caught between a penetrating piece 7 and a circuit conductor 2 and between a penetrating piece 7 and a flat conductor 4, resulting in a poor contact between the piercing piece 7 and the circuit conductor 2 and between the piercing piece 7 and the flat conductor 4. When such a poor contact occurs, the reliability of electrical connection between the circuit conductors 2 of the FPC 1 and the flat conductors 4 of the flat cable 3 decreases.

In addition, a great force is necessary to thrust the penetrating pieces 7 of the connector body 5 into the FPC 1 at which the circuit conductors 2 are disposed and the flat cable 3 having the flat conductors 4 therein. Accordingly, it is difficult to readily attach the connector body 5 and the plate member 6 to the FPC 1 and the flat cable 3.

SUMMARY OF THE INVENTION

The present invention has been made to overcome the conventional problems as above and aims at providing a connection assisting member that enables reliable and easy connection between two circuit boards.

The present invention also aims at providing a circuit board assembly in which two circuit boards are connected by means of the connection assisting member as above.

A connection assisting member according to the present invention is one for connecting a first circuit board having one or more through-holes each of which has a first contact portion formed on an inner surface thereof and a second circuit board having one or more second contact portions that are bendable, the connection assisting member comprising:

a base plate; and one or more projections projecting on a surface of the base plate and having elasticity, wherein when fitted in a corresponding through-hole of the first circuit board as catching a corresponding second contact portion of the second circuit board, each of the one or more projections elastically presses the corresponding second contact portion of the second circuit board against the inner surface of the corresponding through-hole, whereby the first contact portion of the corresponding through-hole and the corresponding second contact portion are electrically connected to each other.

A first circuit board assembly according to the present invention comprises:

the first circuit board;

the second circuit board; and the above-described connection assisting member, wherein each of the one or more projections of the connection assisting member is fitted in the corresponding through-hole of the first circuit board as catching the corresponding second contact portion of the second circuit board, and the corresponding second contact portion of the second circuit board is elastically pressed against the inner surface of the corresponding through-hole of the first circuit board by each of the one or more projections of the connection assisting member, whereby the first contact portion of the corresponding through-hole and the corresponding second contact portion are electrically connected to each other.

A first circuit board assembly according to the present invention comprises:

the first circuit board;

the second circuit board; and the above-described connection assisting member according to claim 1, wherein each of the one or more through-holes of the first circuit board has therein a restricted portion at which an opening width is restricted, and wherein each of the one or more projections of the connection assisting member is fitted in the corresponding through-hole of the first circuit board as catching the corresponding second contact portion of the second circuit board, and the corresponding second contact portion of the second circuit board is elastically pressed against the inner surface of the corresponding through-hole of the first circuit board by each of the one or more projections at a position at least farther away from the second circuit board than the restricted portion is, whereby the first contact portion of the corresponding through-hole and the corresponding second contact portion are electrically connected to each other.

DETAILED DESCRIPTION OF THE INVENTION

Embodiments of the present invention are described below based on the appended drawings.

Embodiment 1

Figure 1:
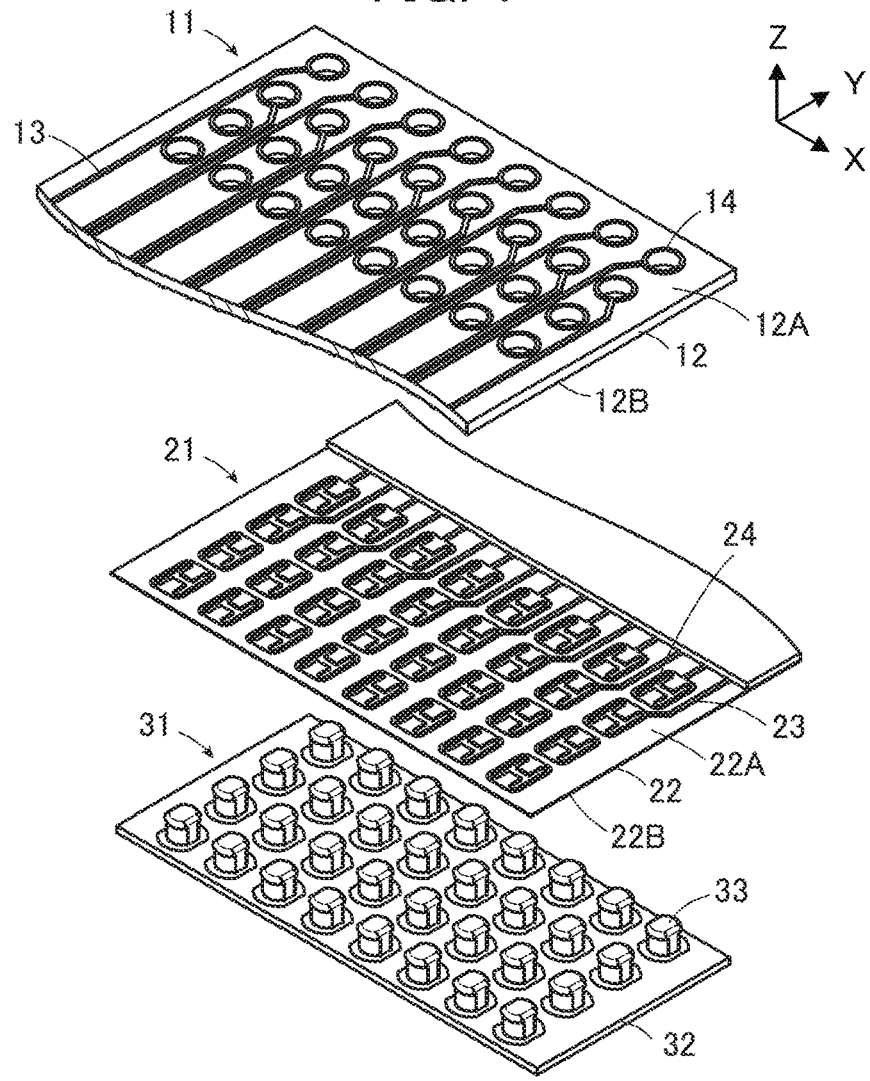
FIG. 1 is a perspective view showing a first circuit board, a second circuit board and a connection assisting member of a circuit board assembly according to Embodiment 1 of the present invention before assembling.

FIG. 1 shows a first circuit board 11, a second circuit board 21 and a connection assisting member 31 which are used in a circuit board assembly according to Embodiment 1, before assembling. The first circuit board 11, the second circuit board 21 and the connection assisting member 31 are each a flat plate member and are arranged parallel to each other. The second circuit board 21 is situated above the connection assisting member 31, and the first circuit board 11 is situated above the second circuit board 21.

For convenience, each of the first circuit board 11, the second circuit board 21 and the connection assisting member 31 is defined as extending along an XY plane, and the direction from the connection assisting member 31 to the first circuit board 11 is referred to as "+Z direction".

Figure 2:
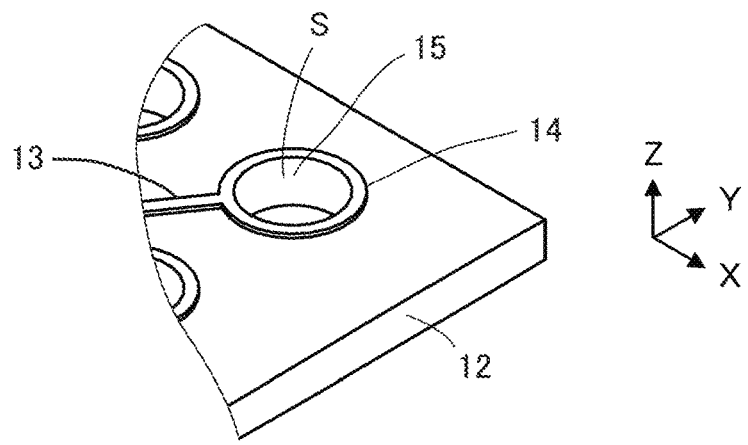
FIG. 2 is a perspective view showing a through-hole of the first circuit board in Embodiment 1.

The first circuit board 11 is for example constituted of a so-called printed circuit board and includes a first substrate 12 having rigidity and insulation properties, a first wiring portion 13 formed on a top surface 12A and a bottom surface 12B of the first substrate 12 or inside the first substrate 12, and a plurality of circular through-holes 14 penetrating from the top surface 12A through the bottom surface 12B of the first substrate 12. The through-holes 14 are arranged in eight rows in the X direction which is the width direction of the first circuit board 11 and in four rows in the Y direction which is the length direction of the first circuit board 11. Thus, 32 through-holes 14 are formed in total. Each through-hole 14 is applied with through-hole plating, whereby a conductive first contact portion 15 is formed over the whole of an inner surface S of the through-hole 14 as shown in FIG. 2. Each first contact portion 15 is connected to the corresponding wire of the first wiring portion 13. The shape of the through-hole 14 is not limited to a circular shape and may be a substantially rectangular flat shape, for instance.

As shown in FIG. 1, of the four rows of through-holes 14 arranged in the Y direction, two rows of through-holes 14 on the +Y direction side are separately connected with wires of the first wiring portion 13 on the top surface 12A of the first substrate 12 facing the +Z direction, while, although not illustrated, two rows of through-holes 14 on the −Y direction side are separately connected with wires of the first wiring portion 13 on the bottom surface 12B of the first substrate 12 facing the −Z direction.

As shown in FIG. 1, the second circuit board 21 includes: a flexible second substrate 22 having insulation properties, a second wiring portion 23 constituted of conductive layers formed on a top surface 22A and a bottom surface 22B of the flexible second substrate 22 and a plurality of H-shaped openings 24. The openings 24 are arranged in eight rows in the X direction which is the width direction of the second circuit board 21 and in four rows in the Y direction which is the length direction of the second circuit board 21, correspondingly to the through-holes 14 of the first circuit board 11. Thus, 32 openings 24 are formed in total.

Figure 3:
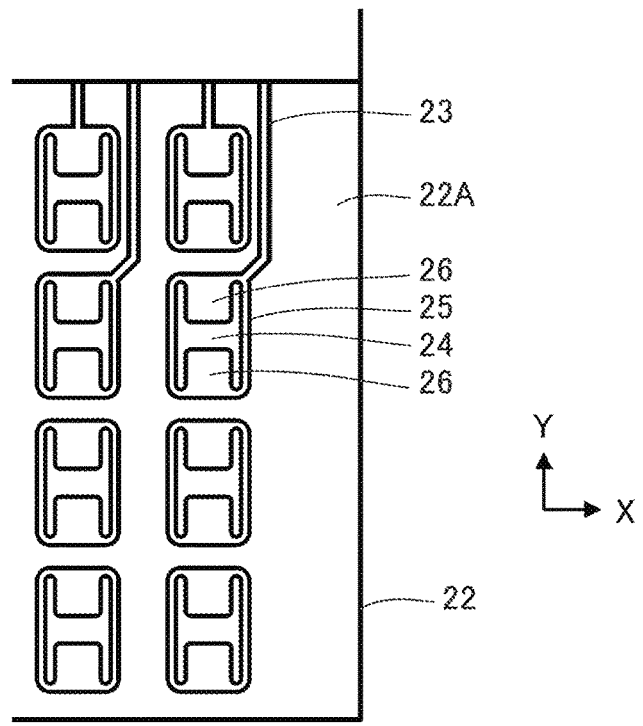
FIG. 3 is a partial plan view showing the second circuit board in Embodiment 1.
Figure 4:
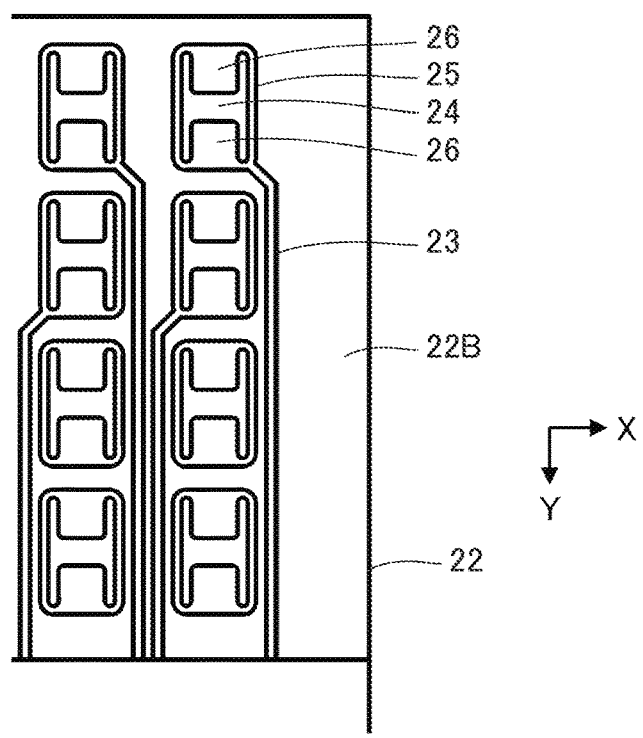
FIG. 4 is a partial bottom view showing the second circuit board in Embodiment 1.

As shown in FIGS. 3 and 4, conductive portions 25 are formed along the circumference of each opening 24, and a pair of conductive second contact portions 26 protrude to face each other in the Y direction in each opening 24. The pair of second contact portions 26 are bendable and are electrically connected to each other via the conductive portion 25 and to the corresponding wire of the second wiring portion 23.

As shown in FIG. 3, the second contact portions 26 provided at, of the four rows of openings 24 arranged in the Y direction, two rows of openings 24 on the +Y direction side are separately connected with wires of the second wiring portion 23 on the top surface 22A of the second substrate 22 facing the +Z direction. As shown in FIG. 4, the second contact portions 26 provided at, of the four rows of openings 24 arranged in the Y direction, two rows of openings 24 on the −Y direction side are separately connected with wires of the second wiring portion 23 on the bottom surface 22B of the second substrate 22 facing the −Z direction.

Figure 5:
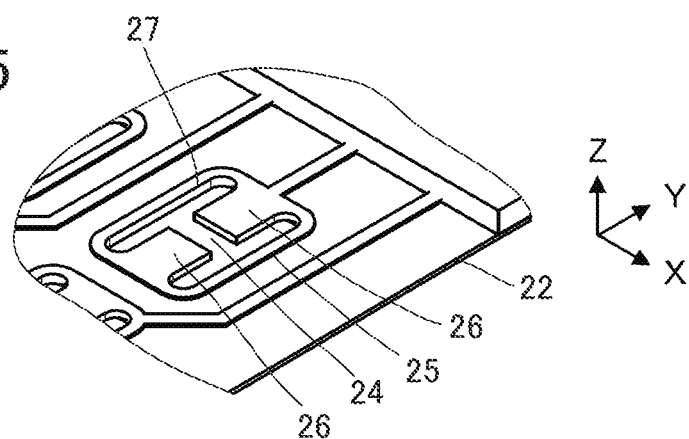
FIG. 5 is a perspective view showing second contact portions of the second circuit board in Embodiment 1.

The conductive portions 25 are formed along the circumference of the corresponding opening 24 on the top surface 22A and the bottom surface 22B of the second substrate 22. As shown in FIG. 5, the conductive portion 25 on the top surface 22A of the second substrate 22 and the conductive portion 25 on the bottom surface 22B thereof are electrically connected to each other via a pair of conductive layers 27 separately formed on a pair of end surfaces (YZ planes) at edges of the opening 24 that face each other in the X direction.

As shown in FIG. 1, the connection assisting member 31 includes a base plate 32 having insulation properties and a plurality of projections 33 projecting on the surface of the base plate 32 facing the +Z direction. The projections 33 are arranged in eight rows in the X direction which is the width direction of the connection assisting member 31 and in four rows in the Y direction which is the length direction of the connection assisting member 31, correspondingly to the through-holes 14 of the first circuit board 11 and the openings 24 of the second circuit board 21. Thus, 32 projections 33 are formed in total.

Figure 6:
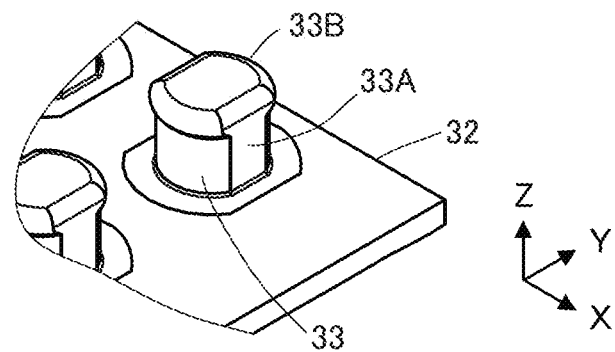
FIG. 6 is a perspective view showing a projection of the connection assisting member in Embodiment 1.

As shown in FIG. 6, the projection 33 projects in the +Z direction from the surface of the base plate 32 and has a substantially circular cylindrical shape provided with cutouts 33A parallel to a YZ plane that are separately formed at the +X directional end and −X directional end of the projection 33. The projection 33 is made of an insulating material such as insulating rubber for example and has elasticity at least in the Y direction.

The +Z directional end of the projection 33 is provided with overhanging portions 33B overhanging in the +Y and −Y directions. The projection amount of the projection 33 from the surface of the base plate 32 is set to be larger than the sum of the plate thicknesses of the first circuit board 11 and the second circuit board 21.

The projection 33 of the connection assisting member 31 is fitted into the corresponding through-hole 14 of the first circuit board 11 as catching the corresponding pair of second contact portions 26 of the second circuit board 21, and when the projection 33 has been fitted in the through-hole 14, each of the pair of second contact portions 26 of the second circuit board 21 is sandwiched between the relevant lateral surface of the projection 33 and the inner surface S of the through-hole 14. In the above state, the projection 33 is defined as having a sufficient size in the Y direction that allows the second contact portions 26 of the second circuit board 21 to be elastically pressed against the inner surface S of the through-hole 14 of the first circuit board 11 and electrically connected to the first contact portion 15 of the first circuit board 11.

Figure 7:
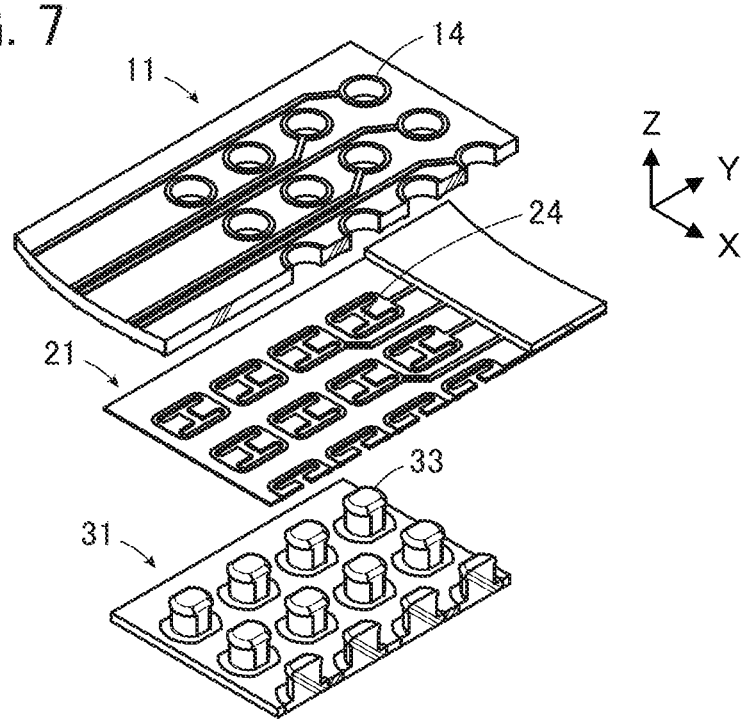
FIG. 7 is a cutaway perspective view showing the first circuit board, the second circuit board and the connection assisting member of the circuit board assembly according to Embodiment 1 before assembling.

When the circuit board assembly is assembled using the first circuit board 11, the second circuit board 21 and the connection assisting member 31 described above, firstly, as shown in FIG. 7, the first circuit board 11, the second circuit board 21 and the connection assisting member 31 are positioned such that the through-holes 14 of the first circuit board 11, the openings 24 of the second circuit board 21 and the projections 33 of the connection assisting member 31 are aligned in the Z direction. Then the connection assisting member 31 is relatively moved in the +Z direction toward the first circuit board 11 such that the projections 33 of the connection assisting member 31 are fitted into the through-holes 14 of the first circuit board 11 through the openings 24 of the second circuit board 21. Thus, the circuit board assembly is assembled.

As described above, the circuit board assembly can be assembled only by superposing the first circuit board 11 and the second circuit board 21 on each other and fitting the projections 33 of the connection assisting member 31 into the through-holes 14 of the first circuit board 11 through the openings 24 of the second circuit board 21, and thus the first circuit board 11 and the second circuit board 21 can be readily interconnected.

When the circuit board assembly is assembled, in the state where the connection assisting member 31 is placed on a fixed surface of, for instance, a workbench, the first circuit board 11 may be pressed down from above toward the connection assisting member 31 with the second circuit board 21 being sandwiched therebetween. Alternatively, this order may be turned upside down, specifically, in the state where the first circuit board 11 is placed on a fixed surface, the connection assisting member 31 may be pressed down from above toward the first circuit board 11 with the second circuit board 21 being sandwiched therebetween.

Figure 8:
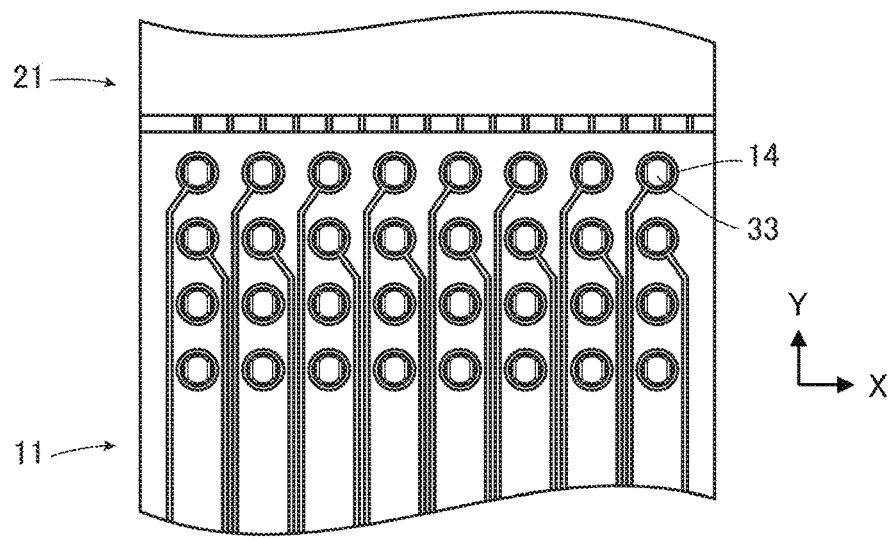
FIG. 8 is a plan view showing the circuit board assembly according to Embodiment 1.
Figure 9:
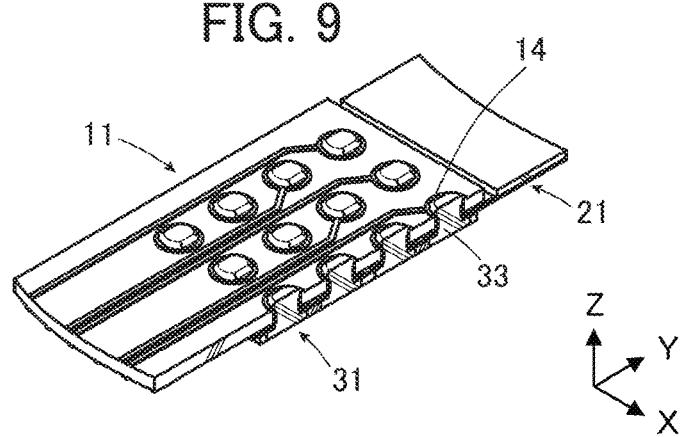
FIG. 9 is a cutaway perspective view showing the circuit board assembly according to Embodiment 1.
Figure 10:
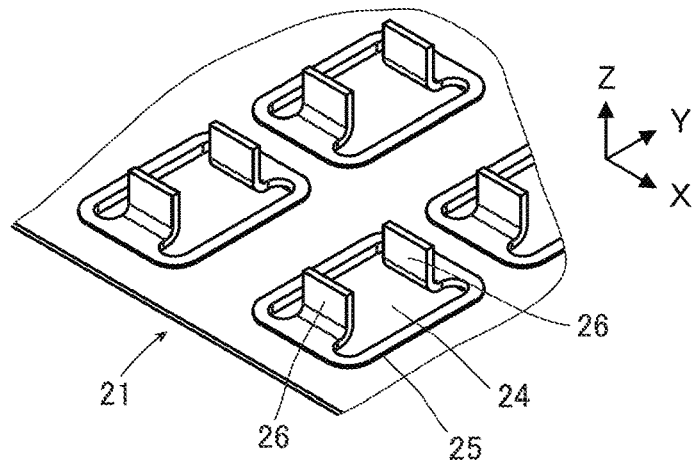
FIG. 10 is a perspective view showing the second contact portions of the second circuit board after assembling.

The circuit board assembly assembled as above is shown in FIGS. 8 and 9. The projections 33 of the connection assisting member 31 are correspondingly fitted in the through-holes 14 of the first circuit board 11. When the projections 33 of the connection assisting member 31 are fitted into the through-holes 14 of the first circuit board 11 through the openings 24 of the second circuit board 21, the pairs of second contact portions 26 protruding in the openings 24 of the second circuit board 21 are pushed in the +Z direction by the projections 33 and, as shown in FIG. 10, bent in the +Z direction in the through-holes 14 of the first circuit board 11.

Figure 11:
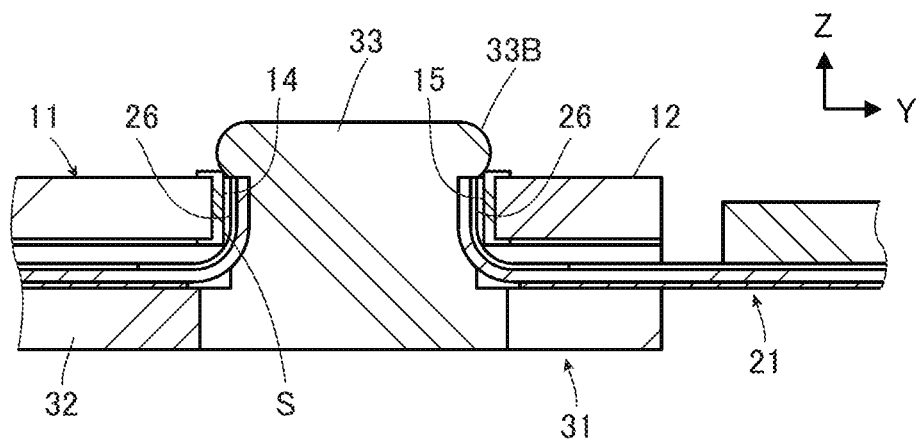
FIG. 11 is an enlarged partial cross-sectional view of the circuit board assembly according to Embodiment 1.

FIG. 11 shows the inside of the through-hole 14 of the first circuit board 11 in which the projection 33 of the connection assisting member 31 is fitted in cross section taken along a YZ plane. The pair of second contact portions 26 of the second circuit board 21 are caught on the projection 33 of the connection assisting member 31, drawn into the through-hole 14 of the first circuit board 11 while being bent in the +Z direction, and sandwiched between the relevant lateral surfaces of the projection 33 and the first contact portion 15 formed on the inner surface S of the through-hole 14. Since the projection 33 of the connection assisting member 31 is made of insulating rubber or the like and thus has elasticity at least in the Y direction, the pair of second contact portions 26 of the second circuit board 21 that are bent in the +Z direction are elastically pressed against the first contact portion 15 of the first circuit board 11 by the projection 33. Thus, the first contact portion 15 of the first circuit board 11 and the pair of second contact portions 26 of the second circuit board 21 are electrically connected to each other in a reliable manner.

Since the first circuit board 11 has the 32 through-holes 14, the connections of 32 electric signal systems in total can be established by assembling the circuit board assembly.

At this time, each pair of second contact portions 26 of the second circuit board 21 individually come into contact with one first contact portion 15 formed on the inner surface S of the corresponding through-hole 14 of the first circuit board 11, whereby the electrical connection between the first circuit board 11 and the second circuit board 21 further improves in reliability.

The number of the through-holes 14 of the first circuit board 11, the number of the openings 24 of the second circuit board 21, and the number of the projections 33 of the connection assisting member 31 are each not limited to "32" and may each be one or more.

As shown in FIG. 11, the +Z directional end of the projection 33 protrudes in the +Z direction from the through-hole 14 of the first circuit board 11, and the overhanging portions 33B of the projection 33 overhang separately in the +Y and −Y directions of the through-hole 14 of the first circuit board 11 on the +Z direction side of the through-hole 14. Since the overhanging portions 33B of each projection 33 of the connection assisting member 31 overhang on the +Z direction side of the corresponding through-hole 14, the connection assisting member 31 is prevented from coming off the first circuit board 11 and the second circuit board 21, thus making it possible to electrically connect the first circuit board 11 and the second circuit board 21 in a stable manner.

The circuit board assembly has the structure in which the projections 33 of the connection assisting member 31 are correspondingly fitted into the through-holes 14 of the first circuit board 11 and accordingly, the second contact portions 26 of the second circuit board 21 are bent and come into direct contact with the first contact portions 15 formed on the inner surfaces S of the through-holes 14 of the first circuit board 11. This structure makes it possible to obtain the circuit board assembly that is extremely thin in the Z direction.

Embodiment 2

In Embodiment 1, the conductive first contact portion 15 is formed over the whole inner surface S of the through-hole 14 of the first circuit board 11, and the pair of electrically-interconnected second contact portions 26 of the second circuit board 21 come into contact with the first contact portion 15, that is, one electric path system is formed for one through-hole 14, however, the invention is not limited thereto.

Figure 12:
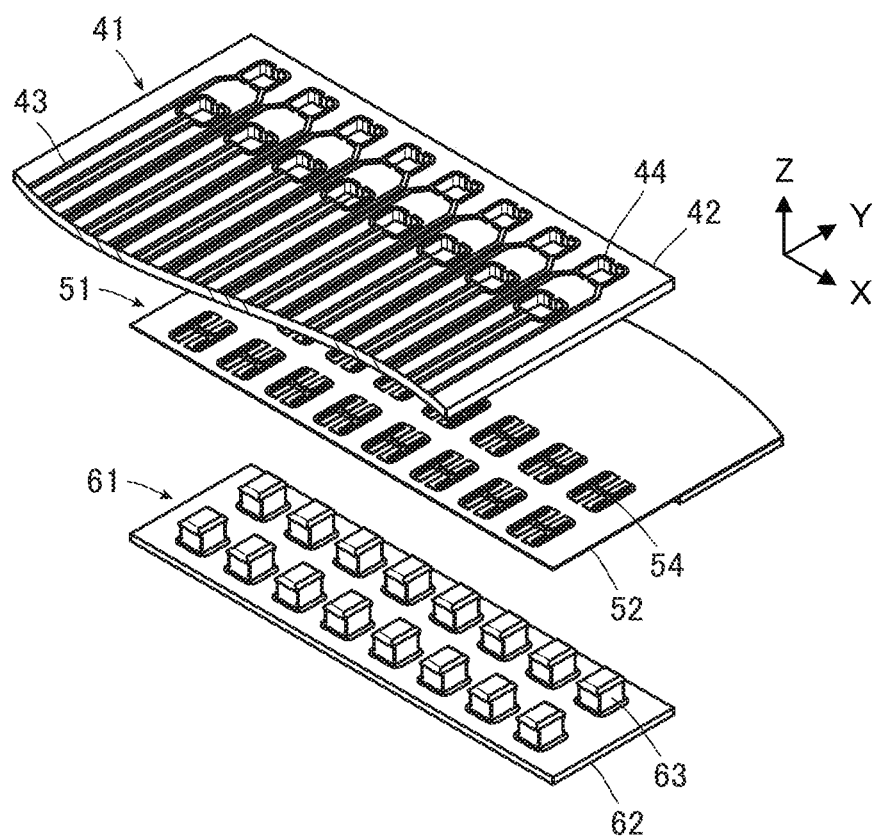
FIG. 12 is a perspective view showing a first circuit board, a second circuit board and a connection assisting member of a circuit board assembly according to Embodiment 2 before assembling.

FIG. 12 shows a first circuit board 41, a second circuit board 51 and a connection assisting member 61 which are used in a circuit board assembly according to Embodiment 2, before assembling.

The first circuit board 41 is for example constituted of a so-called printed circuit board and includes a first substrate 42 having insulation properties and rigidity, a first wiring portion 43 formed on the top surface of the first substrate 42, and a plurality of through-holes 44 penetrating from the top surface through the bottom surface of the first substrate 42. The through-holes 44 are arranged in eight rows in the X direction which is the width direction of the first circuit board 41 and in two rows in the Y direction which is the length direction of the first circuit board 41. Thus, 16 through-holes 44 are formed in total.

The second circuit board 51 includes a plurality of H-shaped openings 54 formed in a flexible second substrate 52 having insulation properties. The openings 54 are arranged in eight rows in the X direction which is the width direction of the second circuit board 51 and in two rows in the Y direction which is the length direction of the second circuit board 51, correspondingly to the through-holes 44 of the first circuit board 41. Thus, 16 openings 54 are formed in total.

The connection assisting member 61 includes a base plate 62 having insulation properties and a plurality of projections 63 projecting on the surface of the base plate 62 facing the +Z direction. The projections 63 are arranged in eight rows in the X direction which is the width direction of the connection assisting member 61 and in two rows in the Y direction which is the length direction of the connection assisting member 61, correspondingly to the through-holes 44 of the first circuit board 41 and the openings 54 of the second circuit board 51. Thus, 16 projections 63 are formed in total.

Figure 13:
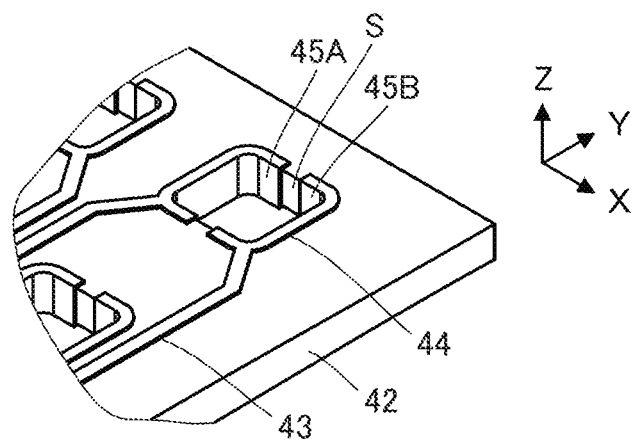
FIG. 13 is a perspective view showing a through-hole of the first circuit board in Embodiment 2.

As shown in FIG. 13, the through-hole 44 of the first circuit board 41 has a substantially rectangular flat shape, and a pair of first contact portions 45A and 45B that are electrically insulated from each other are formed on the inner surface S of the through-hole 44. Those first contact portions 45A and 45B are connected separately to different wires of the first wiring portion 43. In other words, the first contact portions 45A and 45B are electrically insulated from each other in the first circuit board 41.

Figure 14:
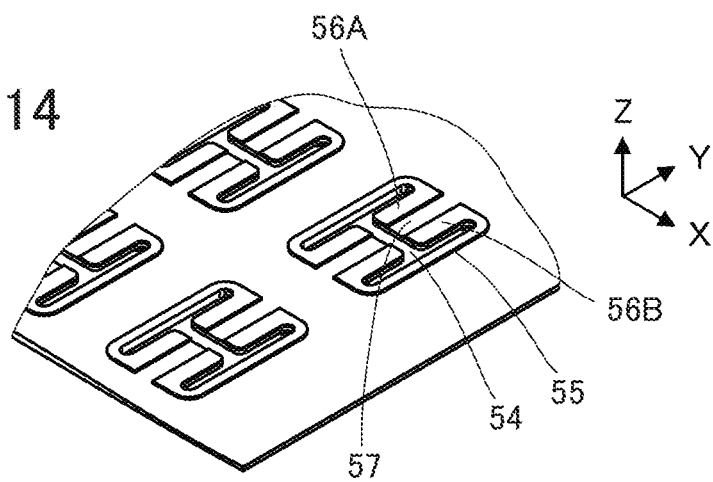
FIG. 14 is a perspective view showing second contact portions of the second circuit board in Embodiment 2.

As shown in FIG. 14, the opening 54 of the second circuit board 51 is provided with a pair of protruding pieces 57 that are formed of part of the flexible second substrate 52 and protrude from a pair of edges of the opening 54 which face each other in the Y direction, toward the interior of the opening 54. A pair of conductive second contact portions 56A are formed at the −X directional ends of the pair of protruding pieces 57, while a pair of conductive second contact portions 56B are formed at the +X directional ends thereof. The pair of second contact portions 56A are electrically interconnected by a conductive portion 55 formed at the −X direction-side end of the opening 54, while the pair of second contact portions 56B are electrically interconnected by a conductive portion 55 formed at the +X direction-side end of the opening 54.

The pairs of second contact portions 56A and 56B are formed on the protruding pieces 57 and thus configured to be bendable so as to follow the bending of the protruding pieces 57.

Although not illustrated, the pairs of second contact portions 56A and 56B are connected separately to different wires of a second wiring portion constituted of a conductive layer formed on the bottom surface of the second substrate 52. In other words, the second contact portions 56A are electrically insulated from the second contact portions 56B in the second circuit board 51.

Figure 15:
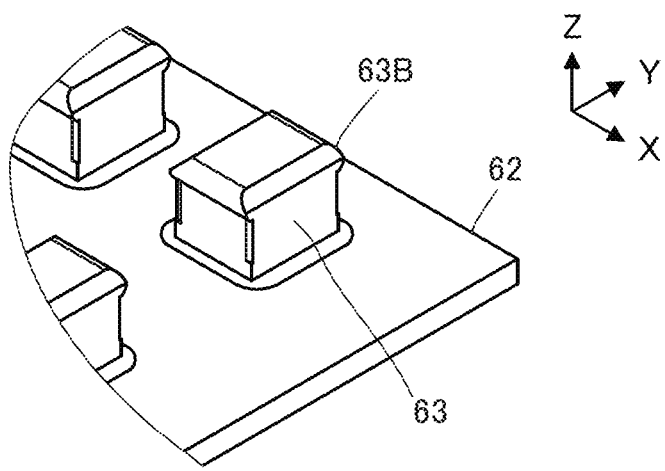
FIG. 15 is a perspective view showing a projection of the connection assisting member in Embodiment 2.

As shown in FIG. 15, the projection 63 of the connection assisting member 61 has a substantially rectangular cylindrical shape protruding in the +Z direction from the surface of the base plate 62. The projection 63 is made of an insulating material such as insulating rubber for example and has elasticity at least in the Y direction.

The +Z directional end of the projection 63 is provided with overhanging portions 63B overhanging in the +Y and −Y directions. The projection amount of the projection 63 from the surface of the base plate 62 is set to be larger than the sum of the plate thicknesses of the first circuit board 41 and the second circuit board 51.

The projection 63 is fitted into the corresponding through-hole 44 of the first circuit board 41 as catching the pairs of second contact portions 56A and 56B of the second circuit board 51, and when the projection 63 has been fitted in the through-hole 44, the second contact portions 56A and 56B of the second circuit board 51 are each sandwiched between the relevant lateral surface of the projection 63 and the inner surface S of the through-hole 44. In the above state, the projection 63 is defined as having a sufficient size in the Y direction that allows the second contact portions 56A and 56B of the second circuit board 51 to be elastically pressed against the inner surface S of the through-hole 44 of the first circuit board 41 such that the first contact portion 45A of the first circuit board 41 is electrically connected to the pair of second contact portions 56A of the second circuit board 51 while the first contact portion 45B of the first circuit board 41 is electrically connected to the pair of second contact portions 56B of the second circuit board 51.

When the circuit board assembly is assembled using the first circuit board 41, the second circuit board 51 and the connection assisting member 61, firstly, the first circuit board 41, the second circuit board 51 and the connection assisting member 61 are positioned such that the through-holes 44 of the first circuit board 41, the openings 54 of the second circuit board 51 and the projections 63 of the connection assisting member 61 are aligned in the Z direction. Then the connection assisting member 61 is relatively moved in the +Z direction toward the first circuit board 41 such that the projections 63 of the connection assisting member 61 are fitted into the through-holes 44 of the first circuit board 41 through the openings 54 of the second circuit board 51. Thus, the circuit board assembly is assembled.

Figure 16:
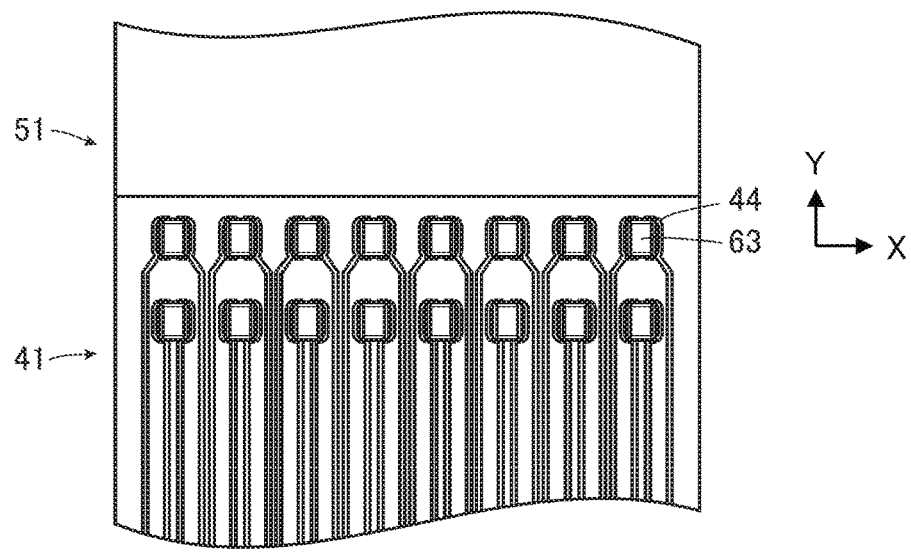
FIG. 16 is a plan view showing the circuit board assembly according to Embodiment 2.
Figure 17:
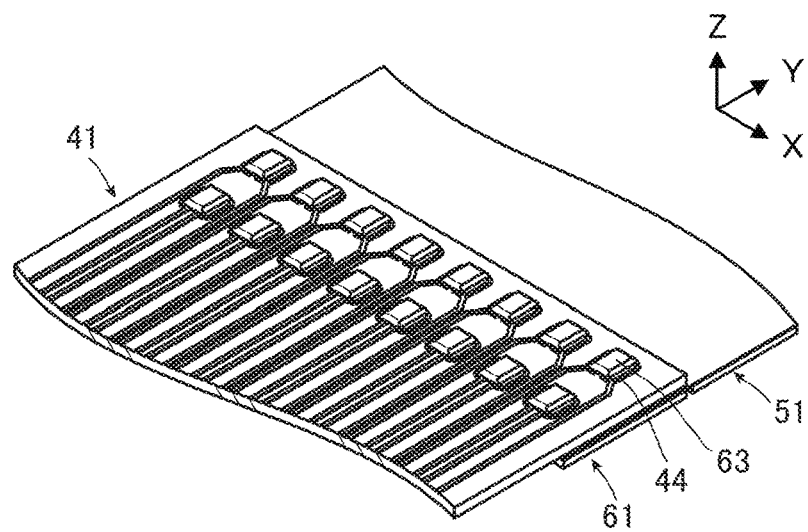
FIG. 17 is a perspective view showing the circuit board assembly according to Embodiment 2.

The circuit board assembly assembled as above is shown in FIGS. 16 and 17. The projections 63 of the connection assisting member 61 are correspondingly fitted in the through-holes 44 of the first circuit board 41. Although not illustrated, when the projections 63 of the connection assisting member 61 are fitted into the through-holes 44 of the first circuit board 41 through the openings 54 of the second circuit board 51, the pairs of protruding pieces 57 protruding in the openings 54 of the second circuit board 51 are pushed in the +Z direction by the projections 63 and bent in the +Z direction in the through-holes 44 of the first circuit board 41. Thus, each protruding piece 57 is sandwiched between the relevant lateral surface of the projection 63 and the inner surface S of the through-hole 44.

Since the projection 63 of the connection assisting member 61 is made of insulating rubber or the like and thus has elasticity at least in the Y direction, the pair of second contact portions 56A formed on the pair of protruding pieces 57, bent in the +Z direction, of the second circuit board 51 are elastically pressed against the first contact portion 45A formed on the inner surface S of the through-hole 44 of the first circuit board 41, while the pair of second contact portions 56B formed on the pair of protruding pieces 57 of the second circuit board 51 are elastically pressed against the first contact portion 45B formed on the inner surface S of the through-hole 44 of the first circuit board 41. Thus, the electric connection between the first contact portion 45A of the first circuit board 41 and the pair of second contact portions 56A of the second circuit board 51 and that between the first contact portion 45B of the first circuit board 41 and the pair of second contact portions 56B of the second circuit board 51 are reliably established.

As described above, the first circuit board 41 and the second circuit board 51 can be connected to each other with two electric path systems being formed for each through-hole 44 of the first circuit board 41. Accordingly, although, in the circuit board assembly according to Embodiment 2, the number of the through-holes 44 of the first circuit board 41 is "16" and is half of the number (i.e., "32") of the through-holes 14 of the first circuit board 11 in Embodiment 1, it is still possible to establish connections of 32 electric signal systems in total as with Embodiment 1.

When the circuit board assembly is assembled, the overhanging portions 63B of each projection 63 of the connection assisting member 61 overhang separately in the +Y and −Y directions of the corresponding through-hole 44 of the first circuit board 41 on the +Z direction side of the through-hole 44, whereby the connection assisting member 61 is prevented from coming off the first circuit board 41 and the second circuit board 51, thus making it possible to electrically connect the first circuit board 41 and the second circuit board 51 in a stable manner.

As with Embodiment 1, also in Embodiment 2, the circuit board assembly can be assembled only by superposing the first circuit board 41 and the second circuit board 51 on each other and fitting the projections 63 of the connection assisting member 61 into the through-holes 44 of the first circuit board 41 through the openings 54 of the second circuit board 51, and thus the first circuit board 41 and the second circuit board 51 can be readily interconnected.

Also in Embodiment 2, the circuit board assembly has the structure in which the projections 63 of the connection assisting member 61 are correspondingly fitted into the through-holes 44 of the first circuit board 41 and accordingly, the second contact portions 56A and 56B of the second circuit board 51 are bent and come into direct contact with the first contact portions 45A and 45B formed on the inner surfaces S of the through-holes 44 of the first circuit board 41. This structure makes it possible to obtain the circuit board assembly that is extremely thin in the Z direction.

The number of the through-holes 44 of the first circuit board 41, the number of the openings 54 of the second circuit board 51, and the number of the projections 63 of the connection assisting member 61 are each not limited to "16" and may each be one or more.

In Embodiment 2, the through-holes 44 of the first circuit board 41 have a substantially rectangular flat shape but may have a circular flat shape as with the through-holes 14 of the first circuit board 11 in Embodiment 1. Since, however, each pair of first contact portions 45A and 45B electrically insulated from each other are formed on the inner surface S of the through-hole 44 and separately brought into contact with the corresponding pairs of second contact portions 56A and 56B of the second circuit board 51, it is preferable that the through-holes 44 have a substantially rectangular flat shape.

Three or more electric path systems may be formed for a single through-hole 44 of the first circuit board 41 by forming three or more first contact portions electrically insulated from one another on the inner surface S of each through-hole 44 and forming three or more second contact portions electrically insulated from one another at each opening 54 of the second circuit board 51.

The projections 33 of the connection assisting member 31 in Embodiment 1 and the projections 63 of the connection assisting member 61 in Embodiment 2 are made of an insulating material such as insulating rubber, however, each projection may be configured to be elastic at least in the Y direction by forming only its surface portion from an insulating material having elasticity, for instance.

While the projection 33 of the connection assisting member 31 in Embodiment 1 has a projection amount from the surface of the base plate 32 of larger than the sum of the plate thicknesses of the first circuit board 11 and the second circuit board 21, the invention is not limited thereto. The projection 33 may have a projection amount of not larger than the sum of the plate thicknesses of the first circuit board 11 and the second circuit board 21 as long as the pair of second contact portions 26 of the second circuit board 21 can be elastically pressed against the first contact portion 15 of the first circuit board 11 and electrically connected thereto. In this case, the connection assisting member 31 cannot be prevented from falling off the first circuit board 11 and the second circuit board 21 by the presence of the overhanging portions 33B of the projection 33 that overhang on the +Z direction side of the through-hole 14 of the first circuit board 11, however, other measures may optionally be taken such as, for instance, provision of a general-purpose fixing mechanism that fixes the connection assisting member 31 to the first circuit board 11 and the second circuit board 21.

Likewise, the projection 63 of the connection assisting member 61 in Embodiment 2 may also have a projection amount from the surface of the base plate 62 of not larger than the sum of the plate thicknesses of the first circuit board 41 and the second circuit board 51.

While the openings 24 of the second circuit board 21 in Embodiment 1 and the openings 54 of the second circuit board 51 in Embodiment 2 have an H shape, the shapes of the openings 24 and 54 are not limited thereto. For instance, U-shaped openings may be formed so that a single second contact portion 26 comes into contact with the first contact portion 15 in one through-hole 14 or that a single second contact portion 56A and a single second contact portion 56B respectively come into contact with the first contact portions 45A and 45B in one through-hole 44. The opening 24, 54 of the second circuit board 21, 51 preferably takes on the shape that enables to obtain a large contact area between the first contact portion 15, 45A, 45B formed in the through-hole 14, 44 of the first circuit board 11, 41 and the second contact portion 26, 56A, 56B of the second circuit board 21, 51 in order to improve the reliability of electrical connection.

Embodiment 3

Figure 18:
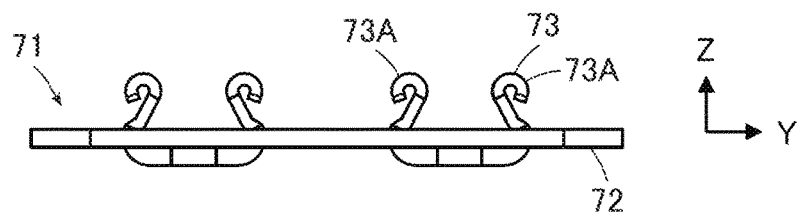
FIG. 18 is a side view showing projections of a connection assisting member used in a circuit board assembly according to Embodiment 3.

In Embodiment 1, since one electric path system is formed for each through-hole 14 of the first circuit board 11, the projections 33 of the connection assisting member 31 need not be made of an insulating material, and projections may be each configured such that at least its surface portion is made of a conductive material. For instance, as shown in FIG. 18, a circuit board assembly can be assembled using, in place of the connection assisting member 31, a connection assisting member 71 in which a plurality of projections 73 constituted of metal springs are disposed at a surface of a base plate 72 so as to be electrically insulated from each other. Each projection 73 includes a pair of arm portions 73A facing each other in the Y direction and having elasticity in the Y direction. The pair of arm portions 73A of each projection 73 are fitted into the corresponding through-hole 14 of the first circuit board 11 of Embodiment 1. When the projection 73 is fitted in the through-hole 14 of the first circuit board 11, the pair of arm portions 73A of the projection 73 elastically deforms while elastically pressing the pair of second contact portions 26 protruding in the opening 24 of the second circuit board 21 against the inner surface S of the through-hole 14 of the first circuit board 11, whereby the first contact portion 15 of the first circuit board 11 and the pair of second contact portions 26 of the second circuit board 21 are electrically connected to each other.

The base plate 72 may be constituted of, for instance, a metal plate having a surface bonded to an insulating film or a material having insulating properties as long as the base plate 72 can hold the projections 73 constituted of metal springs with the projections 73 being electrically insulated from each other.

The connection assisting member 61 in Embodiment 2 may be replaced by the connection assisting member 71 in Embodiment 3 shown in FIG. 18. Since, however, two electric path systems are formed for each through-hole 44 of the first circuit board 41 in Embodiment 2, it is preferable to cover at least the surfaces of the pair of arm portions 73A with an insulating material such as an insulating coat in order to prevent each two electric path systems from short-circuiting due to the presence of the projection 73 constituted of a metal spring.

Alternatively, it is preferable to fit, into each through-hole 44, two projections 73 constituted of metal springs that are held such that they lie adjacent to each other in the X direction to be electrically insulated from each other and to correspond to the first contact portions 45A and 45B of the through-hole 44. In this case, the pair of arm portions 73A of one of the two projections 73 correspond to the first contact portion 45A of the through-hole 44, while the pair of arm portions 73A of the other of the two projections 73 correspond to the first contact portion 45B of the through-hole 44.

Figure 19:
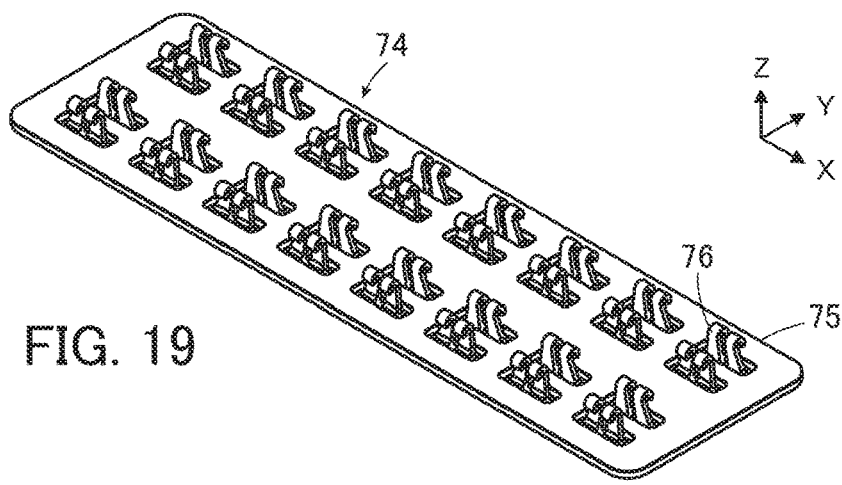
FIG. 19 is a perspective view showing a connection assisting member used in a circuit board assembly according to a modification of Embodiment 3.
Figure 20:
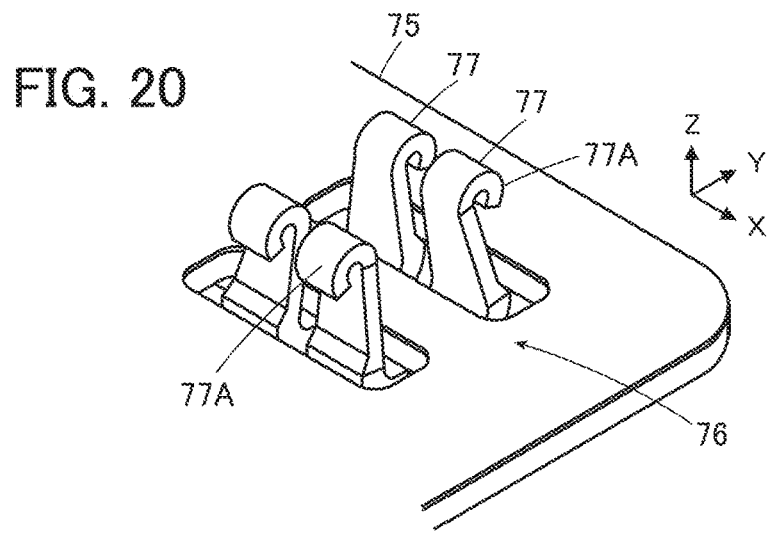
FIG. 20 is a perspective view showing projections of the connection assisting member used in the circuit board assembly according to the modification of Embodiment 3.

FIG. 19 shows a connection assisting member 74 used in a circuit board assembly according to a modification of Embodiment 3. The connection assisting member 74 includes a base plate 75 and a plurality of projection units 76 attached to the base plate 75. The projection units 76 are arranged in eight rows in the X direction which is the width direction of the connection assisting member 74 and in two rows in the Y direction which is the length direction of the connection assisting member 74, correspondingly to the through-holes 44 of the first circuit board 41 and the openings 54 of the second circuit board 51 in Embodiment 2. Thus, 16 projection units 76 are formed in total. As shown in FIG. 20, each projection unit 76 is composed of a pair of projections 77 constituted of metal springs that lie adjacent to each other in the X direction to be electrically insulated from each other, and each projection 77 includes a pair of arm portions 77A facing each other in the Y direction and having elasticity in the Y direction.

The base plate 75 may be constituted of, for instance, a metal plate having a surface bonded to an insulating film or a material having insulating properties.

The pair of projections 77 of each projection unit 76 of the connection assisting member 74 correspond to the pairs of second contact portions 56A and 56B protruding in the relevant opening 54 of the second circuit board 51 and the first contact portions 45A and 45B formed on the inner surface S of the relevant through-hole 44 of the first circuit board 41.

Figure 21:
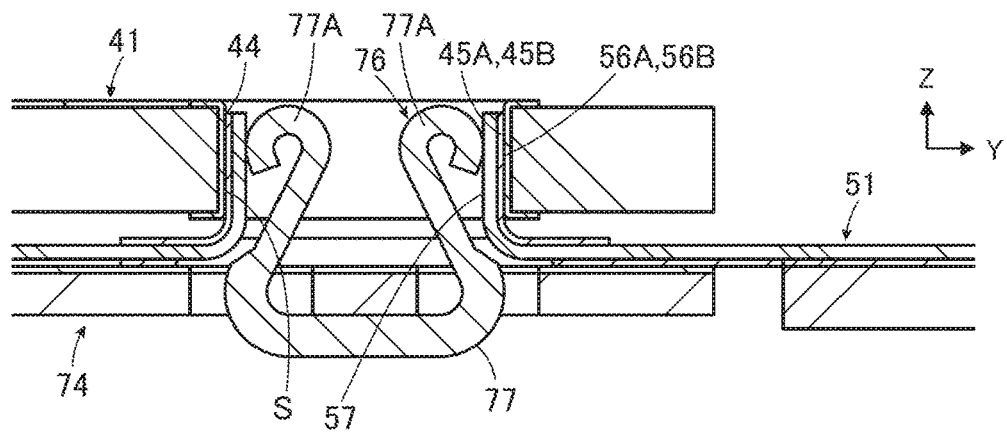
FIG. 21 is an enlarged partial cross-sectional view of the circuit board assembly according to the modification of Embodiment 3.

FIG. 21 shows the inside of the through-hole 44 of the first circuit board 41 in which the projection unit 76 of the connection assisting member 74 is fitted as catching the pairs of second contact portions 56A and 56B of the second circuit board 51 in cross section taken along a YZ plane.

The pair of arm portions 77A of each projection 77 of the projection unit 76 of the connection assisting member 74 elastically deform, and by the two pairs of arm portions 77A, the pair of second contact portions 56A formed on the pair of protruding pieces 57 of the second circuit board 51 are elastically pressed against the first contact portion 45A formed on the inner surface S of the through-hole 44 of the first circuit board 41, while the pair of second contact portions 56B formed on the pair of protruding pieces 57 of the second circuit board 51 are elastically pressed against the first contact portion 45B formed on the inner surface S of the through-hole 44 of the first circuit board 41. Thus, the electric connection between the first contact portion 45A of the first circuit board 41 and the pair of second contact portions 56A of the second circuit board 51 and that between the first contact portion 45B of the first circuit board 41 and the pair of second contact portions 56B of the second circuit board 51 are established.

As described above, the first circuit board 41 and the second circuit board 51 can be connected to each other with two electric path systems being formed for each through-hole 44 of the first circuit board 41.

Embodiment 4

As shown in FIG. 21, the inner surface S of the through-hole 44 of the first circuit board 41 extends perpendicularly to the surface of the first circuit board 41, and the through-hole 44 has a constant opening width in the thickness direction (Z direction) of the first circuit board 41. However, the invention is not limited thereto, and a thorough-hole may be used which has varying opening width in the thickness direction of a first circuit board and thus has therein a restricted portion at which the opening width of the through-hole is restricted.

Figure 22:
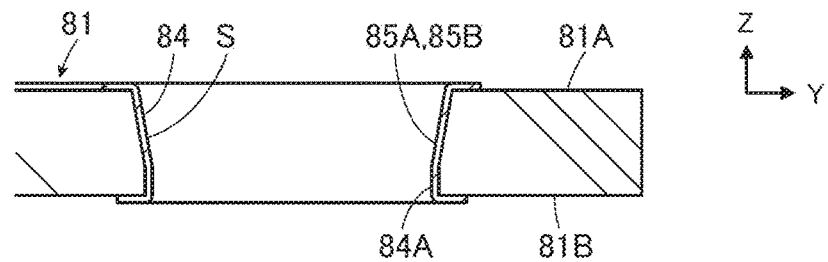
FIG. 22 is a cross-sectional view showing a through-hole of a first circuit board used in a circuit board assembly according to Embodiment 4.

FIG. 22 is a cross-sectional view showing a through-hole 84 of a first circuit board 81 used in a circuit board assembly according to Embodiment 4. The inner surface S of the through-hole 84 has a tapered sectional shape that is tapered in the direction from a +Z direction-side surface 81A of the first circuit board 81 toward a −Z direction-side surface 81B thereof, and a restricted portion 84A at which the opening width is restricted is formed at the −Z directional end of the through-hole 84. As with the through-hole 44 of the first circuit board 41 shown in FIG. 13, a pair of first contact portions 85A and 85B that are separated in the X direction and electrically insulated from each other are formed on the inner surface S of the thus-configured through-hole 84.

Figure 23:
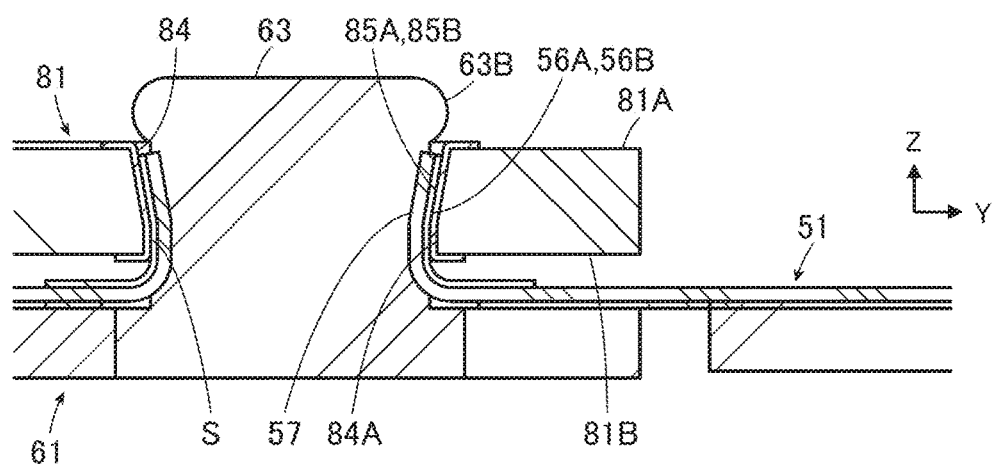
FIG. 23 is an enlarged partial cross-sectional view of the circuit board assembly according to Embodiment 4.

FIG. 23 shows, in cross section, the inside of the through-hole 84 of the first circuit board 81 in which the projection 63 of the connection assisting member 61 in Embodiment 2 is fitted as catching the pairs of second contact portions 56A and 56B of the second circuit board 51.

By the elastically deformed projection 63 of the connection assisting member 61, the pair of second contact portions 56A formed on the pair of protruding pieces 57 of the second circuit board 51 are elastically pressed against the first contact portion 85A formed on the inner surface S of the through-hole 84 of the first circuit board 81, while the pair of second contact portions 56B formed on the pair of protruding pieces 57 of the second circuit board 51 are elastically pressed against the first contact portion 85B formed on the inner surface S of the through-hole 84 of the first circuit board 81. Thus, the electric connection between the first contact portion 85A of the first circuit board 81 and the pair of second contact portions 56A of the second circuit board 51 and that between the first contact portion 85B of the first circuit board 81 and the pair of second contact portions 56B of the second circuit board 51 are established.

At this time, since the restricted portion 84A at which the opening width is restricted is formed at the −Z directional end of the through-hole 84 on the surface 81B side of the first circuit board 81 facing the second circuit board 51, the elastically deforming amount of the projection 63 of the connection assisting member 61 becomes maximum at the restricted portion 84A, so that large contact pressure occurs between the first contact portion 85A of the first circuit board 81 and the pair of second contact portions 56A of the second circuit board 51 and between the first contact portion 85B of the first circuit board 81 and the pair of second contact portions 56B of the second circuit board 51.

Since the inner surface S of the through-hole 84 has a tapered sectional shape that is tapered in the direction from the +Z direction-side surface 81A of the first circuit board 81 toward the −Z direction-side surface 81B thereof, the projection 63 of the connection assisting member 61 is to receive a reaction force having a +Z directional component from the inner surface S of the through-hole 84. Therefore, the connection assisting member 61 is effectively prevented from coming off the first circuit board 81 and the second circuit board 51 in the −Z direction.

Furthermore, since the overhanging portions 63B of the projection 63 of the connection assisting member 61 overhang separately in the +Y and −Y directions of the through-hole 84 of the first circuit board 81 on the +Z direction side of the through-hole 84, the connection assisting member 61 is further effectively prevented from coming off the first circuit board 81 and the second circuit board 51.

Figure 24:
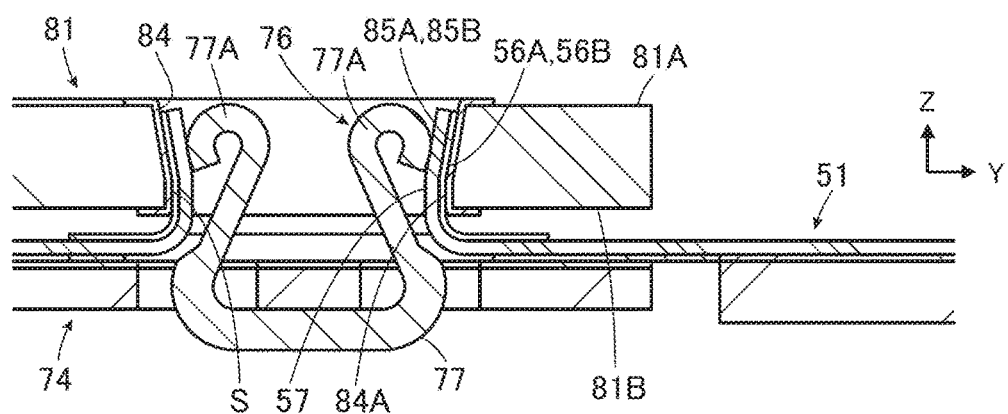
FIG. 24 is an enlarged partial cross-sectional view of a circuit board assembly according to a modification of Embodiment 4.

Now FIG. 24 shows, in cross section, the inside of the through-hole 84 of the first circuit board 81 in which the pair of projections 77 of the projection unit 76 of the connection assisting member 74 in Embodiment 3 are fitted as catching the pairs of second contact portions 56A and 56B of the second circuit board 51.

The pair of arm portions 77A of each projection 77 of the projection unit 76 of the connection assisting member 74 elastically deform, and by the pairs of arm portions 77A, the pair of second contact portions 56A formed on the pair of protruding pieces 57 of the second circuit board 51 are elastically pressed against the first contact portion 85A formed on the inner surface S of the through-hole 84 of the first circuit board 81, while the pair of second contact portions 56B formed on the pair of protruding pieces 57 of the second circuit board 51 are elastically pressed against the first contact portion 85B formed on the inner surface S of the through-hole 84 of the first circuit board 81. Thus, the electric connection between the first contact portion 85A of the first circuit board 81 and the pair of second contact portions 56A of the second circuit board 51 and that between the first contact portion 85B of the first circuit board 81 and the pair of second contact portions 56B of the second circuit board 51 are established.

At this time, since the restricted portion 84A at which the opening width is restricted is formed at the −Z directional end of the through-hole 84 on the surface 81B side of the first circuit board 81 facing the second circuit board 51, the projections 77 of the connection assisting member 74 are effectively prevented from coming off the through-hole 84 in the −Z direction. In other words, the connection assisting member 74 is prevented from coming off the first circuit board 81 and the second circuit board 51 in the −Z direction.

Embodiment 5

Figure 25:
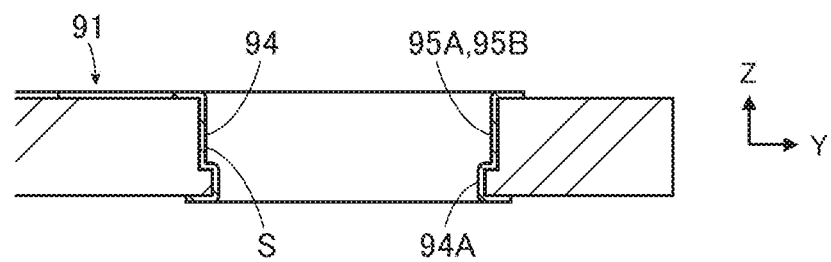
FIG. 25 is a cross-sectional view showing a through-hole of a first circuit board used in a circuit board assembly according to Embodiment 5.

FIG. 25 shows a cross section of a through-hole 94 of a first circuit board 91 used in a circuit board assembly according to Embodiment 5. A step is formed at the −Z directional end of the through-hole 94 such that the opening width of the through-hole 94 narrows at the step, and this step forms a restricted portion 94A at which the opening width is restricted. As with the through-hole 44 of the first circuit board 41 shown in FIG. 13, a pair of first contact portions 95A and 95B that are separated in the X direction and electrically insulated from each other are formed on the inner surface S of the thus-configured through-hole 94.

Figure 26:
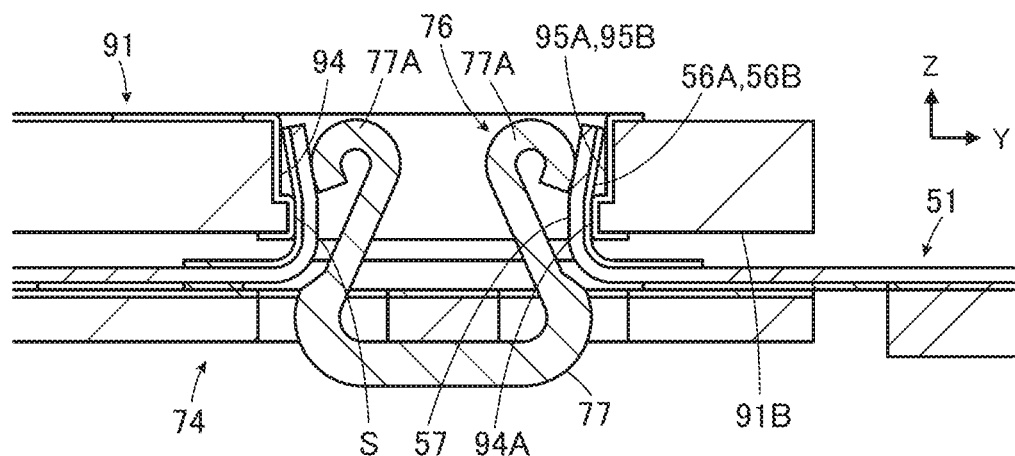
FIG. 26 is an enlarged partial cross-sectional view of the circuit board assembly according to Embodiment 5.
Figure 27:
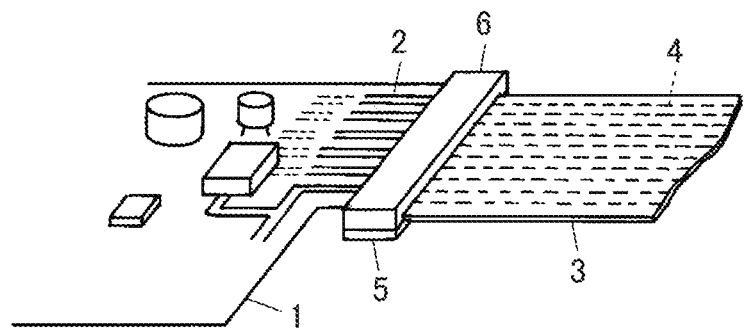
FIG. 27 is a perspective view showing a conventional connector connecting an FPC and a flat cable.
Figure 28:
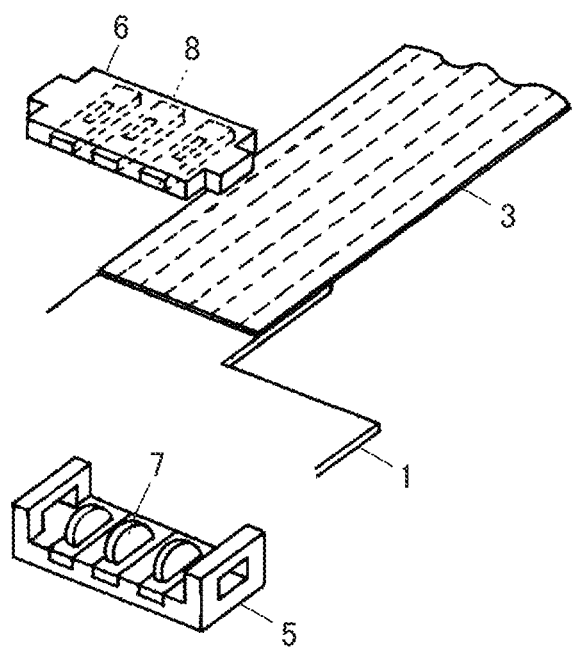
FIG. 28 is an exploded perspective view of the conventional connector connecting the FPC and the flat cable.

FIG. 26 shows, in cross section, the inside of the through-hole 94 of the first circuit board 91 in which the pair of projections 77 of the projection unit 76 of the connection assisting member 74 in Embodiment 3 are fitted as catching the pairs of second contact portions 56A and 56B of the second circuit board 51.

The pair of arm portions 77A of each projection 77 of the projection unit 76 of the connection assisting member 74 elastically deform, and by the pairs of arm portions 77A, the pair of second contact portions 56A formed on the pair of protruding pieces 57 of the second circuit board 51 are elastically pressed against the first contact portion 95A formed on the inner surface S of the through-hole 94 of the first circuit board 91, while the pair of second contact portions 56B formed on the pair of protruding pieces 57 of the second circuit board 51 are elastically pressed against the first contact portion 95B formed on the inner surface S of the through-hole 94 of the first circuit board 91. Thus, the electric connection between the first contact portion 95A of the first circuit board 91 and the pair of second contact portions 56A of the second circuit board 51 and that between the first contact portion 95B of the first circuit board 91 and the pair of second contact portions 56B of the second circuit board 51 are established.

At this time, since the restricted portion 94A at which the opening width is restricted is formed at the −Z directional end of the through-hole 94 on a surface 91B side of the first circuit board 91 facing the second circuit board 51, the projections 77 of the connection assisting member 74 are effectively prevented from coming off the through-hole 94 in the −Z direction. In other words, the connection assisting member 74 is prevented from coming off the first circuit board 91 and the second circuit board 51 in the −Z direction.

Even when, in place of the pair of projections 77 of the projection unit 76 of the connection assisting member 74 in Embodiment 3, the projection 63 of the connection assisting member 61 in Embodiment 2 is fitted into the through-hole 94 of the first circuit board 91, the projection 63 of the connection assisting member 61 is likewise effectively prevented from coming off the through-hole 94 in the −Z direction.

The first circuit board 11, the second circuit board 21 and the connection assisting member 31 in Embodiment 1, the first circuit board 41, the second circuit board 51 and the connection assisting member 61 in Embodiment 2, the connection assisting members 71 and 74 in Embodiment 3, the first circuit board 81 in Embodiment 4, and the first circuit board 91 in Embodiment 5 may each have a positioning mechanism such that the relevant circuit board assembly can be readily assembled without misalignment.

While, in Embodiments 1 and 2, the first circuit boards 11 and 41 are respectively constituted of printed circuit boards including the first substrates 12 and 42 having insulation properties and rigidity, each may be constituted of a so-called rigid flexible circuit board or a circuit board including a first substrate that is flexible such as a flexible printed circuit (FPC) as long as each has a through-hole provided at its inner surface S with a first contact portion. Likewise, the first circuit boards 81 and 91 in Embodiments 4 and 5 may each be constituted of any of a rigid printed circuit board, a rigid flexible circuit board and a flexible printed circuit.

While, in Embodiments 1 to 2, the second circuit boards 21 and 51 are constituted of the circuit boards including the flexible second substrates 22 and 52 having insulation properties, the invention is not limited thereto, and each may be constituted of a printed circuit board or a rigid flexible circuit board as long as each has a bendable second contact portion.

What is claimed is:

1. A connection assisting member for connecting a first circuit board having one or more through-holes each of which has a first contact portion formed on an inner surface thereof and a second circuit board having one or more second contact portions that are bendable, the connection assisting member comprising:
a base plate; and
one or more elastic projections projecting on a surface of the base plate and being elastically deformable,
wherein when fitted in a corresponding through-hole of the first circuit board as catching a corresponding second contact portion of the second circuit board, each of the one or more elastic projections is elastically deformed to elastically press the corresponding second contact portion of the second circuit board against the inner surface of the corresponding through-hole, whereby the first contact portion of the corresponding through-hole and the corresponding second contact portion are electrically connected to each other.

2. The connection assisting member according to claim 1, wherein a projection amount of the one or more elastic projections from the surface of the base plate is larger than a sum of plate thicknesses of the first circuit board and the second circuit board.

3. The connection assisting member according to claim 1, wherein at least a surface portion of the one or more elastic projections is made of a conductive material.

4. The connection assisting member according to claim 3, wherein each of the one or more elastic projections is constituted of a metal spring.

5. The connection assisting member according to claim 3, wherein a plurality of the elastic projections are disposed on the surface of the base plate while being electrically insulated from each other.

6. The connection assisting member according to claim 1, wherein at least a surface portion of the one or more elastic projections is made of an insulating material.

7. The connection assisting member according to claim 6, wherein the insulating material is insulating rubber.

8. The connection assisting member according to claim 6, comprising a plurality of the elastic projections disposed on the surface of the base plate.

9. The connection assisting member according to claim 6, wherein each of the one or more elastic projections has an overhanging portion that projects from a surface of the first circuit board facing an opposite side from the second circuit board and overhangs from the corresponding through-hole in a direction along the surface of the first circuit board when each of the one or more elastic projections is fitted in the corresponding through-hole of the first circuit board as catching the corresponding second contact portion of the second circuit board.

10. A circuit board assembly, comprising:
the first circuit board;
the second circuit board; and
the connection assisting member according to claim 1,
wherein each of the one or more elastic projections of the connection assisting member is fitted in the corresponding through-hole of the first circuit board as catching the corresponding second contact portion of the second circuit board, and the corresponding second contact portion of the second circuit board is elastically pressed against the inner surface of the corresponding through-hole of the first circuit board by each of the one or more elastic projections of the connection assisting member that is elastically deformed, whereby the first contact portion of the corresponding through-hole and the corresponding second contact portion are electrically connected to each other.

11. The circuit board assembly according to claim 10, wherein each of the one or more through-holes of the first circuit board has a plurality of the first contact portions formed on the inner surface, and each of the one or more elastic projections is fitted in the corresponding through-hole as catching a plurality of the second contact portions of the second circuit board, whereby the plurality of the first contact portions of the first circuit board and the plurality of the second contact portions of the second circuit board are correspondingly electrically connected to each other.

12. The circuit board assembly according to claim 10, wherein the second circuit board comprises a flexible insulating substrate on which a conductive layer is formed, and the one or more second contact portions are connected to the conductive layer.

13. A circuit board assembly, comprising:
the first circuit board;
the second circuit board; and
the connection assisting member according to claim 1,
wherein each of the one or more through-holes of the first circuit board has therein a restricted portion at which an opening width is restricted, and
wherein each of the one or more elastic projections of the connection assisting member is fitted in the corresponding through-hole of the first circuit board as catching the corresponding second contact portion of the second circuit board, and the corresponding second contact portion of the second circuit board is elastically pressed against the inner surface of the corresponding through-hole of the first circuit board by each of the one or more elastic projections elastically deformed at a position at least farther away from the second circuit board than the restricted portion is, whereby the first contact portion of the corresponding through-hole and the corresponding second contact portion are electrically connected to each other.

14. The circuit board assembly according to claim 13, wherein each of the one or more through-holes of the first circuit board has a tapered sectional shape that is tapered in a direction from one side of the first circuit board facing an opposite side from the second circuit board toward the other side of the first circuit board facing the second circuit board, and
wherein the restricted portion is formed at an end of each of the one or more through-holes on the other side of the first circuit board facing the second circuit board.

15. The circuit board assembly according to claim 13, wherein each of the one or more through-holes of the first circuit board has a step at which the opening width of each of the one or more through-holes narrows, on a side of the first circuit board facing the second circuit board, and
wherein the restricted portion is formed from the step.

16. The circuit board assembly according to claim 13, wherein each of the one or more through-holes of the first circuit board has a plurality of the first contact portions formed on the inner surface, and each of the one or more elastic projections is fitted in the corresponding through-hole as catching a plurality of the second contact portions of the second circuit board, whereby the plurality of the first contact portions of the first circuit board and the plurality of the second contact portions of the second circuit board are correspondingly electrically connected to each other.

17. The circuit board assembly according to claim 13, wherein the second circuit board comprises a flexible insulating substrate on which a conductive layer is formed, and the one or more second contact portions are connected to the conductive layer.

18. A connection assisting member for connecting a first circuit board having one or more through-holes each of which has a first contact portion formed on an inner surface thereof and a second circuit board having one or more second contact portions that are bendable, the connection assisting member comprising:
a base plate; and
one or more elastic projections projecting on a surface of the base plate and having made of elastically deformable insulting rubber,
wherein when fitted in a corresponding through-hole of the first circuit board as catching a corresponding second contact portion of the second circuit board, each of the one or more elastic projections is elastically deformed to elastically press the corresponding second contact portion of the second circuit board against the inner surface of the corresponding through-hole, whereby the first contact portion of the corresponding through-hole and the corresponding second contact portion are electrically connected to each other.

19. A connection assisting member for connecting a first circuit board having one or more through-holes each of which has a first contact portion formed on an inner surface thereof and a second circuit board having one or more second contact portions that are bendable, the connection assisting member comprising:
a base plate; and
one or more elastic projections projecting on a surface of the base plate and being constituted of elastically deformable metal spring,
wherein when fitted in a corresponding through-hole of the first circuit board as catching a corresponding second contact portion of the second circuit board, each of the one or more elastic projections is elastically deformed to elastically press the corresponding second contact portion of the second circuit board against the inner surface of the corresponding through-hole, whereby the first contact portion of the corresponding through-hole and the corresponding second contact portion are electrically connected to each other.

* * * * *